United States Patent
Cary et al.

(10) Patent No.: US 12,486,101 B2
(45) Date of Patent: Dec. 2, 2025

(54) SUBSTANCE DISPENSER AND A METHOD OF PROVIDING A SUBSTANCE DISPENSER

(71) Applicant: Mr & Mrs Oliver Ltd., London (GB)

(72) Inventors: Horatio Cary, London (GB); Neil Thompson, London (GB)

(73) Assignee: Mr & Mrs Oliver Ltd., London (GB)

( * ) Notice: Subject to any disclaimer, the term of this patent is extended or adjusted under 35 U.S.C. 154(b) by 0 days.

(21) Appl. No.: 17/800,760

(22) PCT Filed: Jan. 22, 2021

(86) PCT No.: PCT/EP2021/051512
§ 371 (c)(1),
(2) Date: Aug. 18, 2022

(87) PCT Pub. No.: WO2021/164983
PCT Pub. Date: Aug. 26, 2021

(65) Prior Publication Data
US 2023/0096830 A1    Mar. 30, 2023

(30) Foreign Application Priority Data
Feb. 18, 2020    (GB) ..................................... 2002203

(51) Int. Cl.
*B65D 83/761*    (2025.01)
*A45D 34/00*    (2006.01)
(Continued)

(52) U.S. Cl.
CPC ........... *B65D 83/761* (2025.01); *A45D 34/00* (2013.01); *A45D 40/00* (2013.01); *G01F 11/025* (2013.01);
(Continued)

(58) Field of Classification Search
CPC ... B65D 83/0011; G01F 11/025; A45D 34/00; A45D 40/00; A45D 2200/055; A45D 2200/051; A45D 2200/052
See application file for complete search history.

(56) References Cited

U.S. PATENT DOCUMENTS

| | | | | |
|---|---|---|---|---|
| 747,826 | A * | 12/1903 | Wiseman | G01F 11/025 215/16 |
| 2,058,290 | A * | 10/1936 | Beaumont | B65D 83/761 222/320 |

(Continued)

FOREIGN PATENT DOCUMENTS

| | | |
|---|---|---|
| DE | 27 05 655 A1 | 8/1978 |
| WO | 03/057581 A1 | 7/2003 |

OTHER PUBLICATIONS

Search Report mailed on Apr. 1, 2021, in connection with Int'l Application No. PCT/EP2021/051512, filed Jan. 22, 2021, 3 pages.

(Continued)

*Primary Examiner* — Jeremy Carroll
(74) *Attorney, Agent, or Firm* — McDonnell Boehnen Hulbert & Berghoff, LLP

(57) ABSTRACT

The invention provides a substance dispenser for dispensing a metered amount of a substance such as a cream or gel, other viscous or non-viscous substance, the dispenser comprising: a first housing member defining a handle for the dispenser; a cream containing chamber arranged to slide telescopically with respect to the handle member, the cream containing chamber having a nozzle opening at a first end, from which cream is, in use, dispensed; a bearing at the second axial end; and a shaft rotatably fixed with respect to the handle and arranged to pass through the bearing such that upon rotation of the handle with respect to the cream containing chamber, the cream containing chamber and the handle move telescopically with respect to each other such (Continued)

that, the substance containing chamber moves axially within the handle to force cream through the nozzle opening, wherein movement of the handle with respect to the cream containing chamber is indexed so as to dispense a predetermined volume of cream in dependence on a rotation thereof.

20 Claims, 5 Drawing Sheets

(51) Int. Cl.
  *A45D 40/00* (2006.01)
  *G01F 11/02* (2006.01)
(52) U.S. Cl.
  CPC .. *A45D 2200/051* (2013.01); *A45D 2200/052* (2013.01); *A45D 2200/055* (2013.01)

(56) References Cited

U.S. PATENT DOCUMENTS

| | | | | |
|---|---|---|---|---|
| 4,445,626 A * | 5/1984 | Steffen | ............... | G01F 11/023 222/386 |
| 4,595,124 A * | 6/1986 | Duval | ............... | A45D 40/04 401/266 |
| 5,092,496 A * | 3/1992 | Gayle | ............... | G01F 11/025 92/240 |
| 5,186,563 A * | 2/1993 | Gebhard | ............... | B65D 47/42 401/164 |
| 5,827,002 A * | 10/1998 | Nakajima | ............... | A45D 34/042 401/172 |
| 6,474,891 B1 * | 11/2002 | Liu | ............... | B43K 8/04 401/172 |
| 8,511,323 B2 * | 8/2013 | Jimenez | ............... | B65D 83/761 401/175 |
| 8,590,747 B2 * | 11/2013 | Keller | ............... | A61B 17/8822 222/137 |
| 2014/0197195 A1 * | 7/2014 | Peuker | ............... | B65D 81/325 222/39 |
| 2017/0106387 A1 * | 4/2017 | Lai | ............... | G01F 23/02 |
| 2018/0199692 A1 * | 7/2018 | Olson | ............... | A45D 40/04 |
| 2019/0029395 A1 | 1/2019 | Porter | | |

OTHER PUBLICATIONS

Written Opinion mailed on Apr. 1, 2021, in connection with Int'l Application No. PCT/EP2021/051512, filed Jan. 22, 2021, 5 pages.

* cited by examiner

SUBSTANCE DISPENSER AND A METHOD OF PROVIDING A SUBSTANCE DISPENSER

CROSS-REFERENCE TO RELATED APPLICATIONS

This application is a U.S. national phase of International Application No. PCT/EP2021/051512, filed on Jan. 22, 2021, which claims priority to Great Britain Patent Application No. 2002203.4, filed on Feb. 18, 2020, both of which are incorporated by reference herein in their entirety.

The present invention relates to a dispenser for a cream or gel, other viscous or non-viscous substance and a method of providing such a dispenser. In embodiments, the invention relates to apparatus and method for dispensing a controlled metered amount of a cream, gel, other viscous or non-viscous substance or other substance such as a medicinal ointment or a cosmetic cream.

Medical or cosmetic cream composition are typically provided in dispensers such as deformable tube or cylindrical rigid tube.

WO-A-2019/001,687 discloses a dispensing container for viscous products such as a cream. The dispenser includes a cream pot having an inner cylinder that defines a storage volume configured to store viscous products such as the cream. A cap is provided, configured to close the cream pot and have a dispensing outlet. A screw rod is rotatably connected to the cream pot. A piston having an inner thread and being coupled to the screw rod is provided such that rotation of the screw rod leads to movement of the piston in the inner cylinder along a longitudinal axis of the screw rod to reduce the storage volume of the inner cylinder and thereby to dispense the product through the dispensing outlet. An indexing mechanism is provided that is configured to lock the screw rod in a plurality of rotational positions with respect to the cream pot. The indexing mechanism comprises various indexing spring elements located at the screw road and indexing sections located at a bottom of the cream pot. The indexing spring elements of the screw rod are configured to interact with the indexing sections of the cream pot in order to lock the screw rod with respect to the cream pot.

EP-A-2,123,188 discloses a container for a cream. The container is air-tight and is arranged so as to enable quick recognition of how much of the content of the pot has been extruded.

WO-A-2010/081,205 discloses a hermetic coupling for a device in the shape of a disc that rotates in one direction only and is fixed in the same plane with respect to a body of the device. The system is arranged such that it may be configured to apply enough pressure to a product such as a cream within the container to open a protective dosing valve and allow an exact dosage of the product to be dispensed from the device.

WO-A-2007/005,883 discloses a dispenser for dispensing a metered dose of a cream such as a medicine. The device comprises a barrel and a base having a threaded rod extending therefrom. A riser is provided having a flexible seal which engages the barrel. An applicator cap is provided having apertures therein for spreading dispensed cream onto a user's skin. Tactile and audible feedback is provided by the device such that a user knows how much cream has been dispensed and when.

According to a first aspect of the present invention, there is provided a cream dispenser for dispensing a metered amount of a cream, the dispenser comprising a first housing member defining a handle for the dispenser; a cream containing chamber arranged to slide telescopically with respect to the handle member, the cream containing chamber having a nozzle opening at a first end, from which cream is, in use, dispensed; a bearing axially fixed with respect to the cream containing chamber at the second axial end; a shaft rotatably fixed with respect to the handle and arranged to pass through the bearing such that upon rotation of the handle with respect to the cream containing chamber, the cream containing chamber and the handle move telescopically with respect to each other such that, the substance containing chamber moves axially within the handle, or the handle moves axially within the substance containing chamber, to force cream through the nozzle opening, wherein movement of the handle with respect to the cream containing chamber is indexed so as to dispense a predetermined volume of cream in dependence on a rotation thereof.

In an embodiment, the bearing and the shaft are arranged in a threaded engagement.

In an embodiment, the thread on the shaft is discontinuous around the body of the shaft.

In an embodiment, the shaft has a generally tubular body with the thread arranged on an about circumferential surface thereof, and wherein the discontinuity is formed by a longitudinal groove extending along at least part of the length of the shaft. In another example, although not shown in the accompanying figures, the discontinuity is formed by a longitudinal projection or ridge which again can interact with an end of the leaf spring as the handle and the bearing rotate relative to each other.

In an embodiment, the shaft has at least two longitudinal grooves formed along its length on different sides of the shaft such that each part of the thread extends radially for less than 180 degrees.

In an embodiment, the bearing has a spring member biased to engage with an edge of the one or more grooves. The grooves are preferably longitudinal grooves extending along the length of the shaft.

In an embodiment, the spring member is a radial leaf spring having an engagement end that is biased into the one or more grooves and when in position in one of the one or more grooves temporarily locks the shaft (and plunger fixed to the end of the shaft) rotationally with respect to the bearing.

In an embodiment, the leaf spring has an engagement end with a shaped cam to engage an edge of the one or more longitudinal grooves.

In an embodiment, an angle is selected for the cam to ensure that accidental rotation of the handle and cream containing container does not happen.

In an embodiment, the bearing or indexing mechanism comprises a spring member biased to engage with a groove or projection provided on an inner cylindrical surface of the handle.

Accordingly, in this embodiment an indexing mechanism is provided on an inner cylindrical surface of the handle, as opposed to being provided by a discontinuous thread provided on the shaft. This can simplify the manufacture of the shaft since no grooves are required on it. The biasing mechanism in this embodiment will be biased outwards instead of inwards as the interaction between the spring and the groove or projection is directed outwards. It is preferable that the component of the biasing mechanism that is provided to engage with the spring, i.e. the component on the inner cylindrical surface of the handle, is a projection, although again, as with the first embodiment it is possible that a groove be provided in the outer wall, into which the end of the leaf spring will be biased when at the appropriate position. The indexing mechanism, in a further non-limiting embodiment, could be two separate parts, being a threaded bearing and a separate leaf spring or either part could be integrated into the handle design.

In an embodiment, the inner cylindrical surface of the handle has at least two longitudinal grooves or projections formed thereon. In combination with an outward facing spring or biasing element provided as part of the bearing this would function as an indexing mechanism as the handle and chamber 16 (and therefore bearing as it is rotationally fixed with respect to the chamber 16) rotate relative to each other.

According to a second aspect of the present invention, there is provided a method of providing a dispenser such as a cream dispenser, the method comprising providing a first housing member defining a handle for the dispenser; a substance containing chamber arranged to slide telescopically with respect to the handle member, the substance containing chamber having a nozzle opening at a first end, from which substance is, in use, dispensed; a bearing axially fixed with respect to the substance containing chamber at the second axial end; a shaft rotatably fixed with respect to the handle and arranged to pass through the bearing such that upon rotation of the handle with respect to the substance containing chamber, the substance containing chamber and the handle move telescopically with respect to each other such that, the substance containing chamber moves axially within the handle, or the handle moves axially within the substance containing chamber, to force substance through the nozzle opening, wherein movement of the handle with respect to the substance containing chamber is indexed so as to dispense a predetermined volume of substance in dependence on a rotation thereof.

According to a second aspect of the present invention, there is provided a dispenser for dispensing a metered amount of a substance, the dispenser comprising a first housing member defining a handle for the dispenser; a substance containing chamber arranged to slide telescopically with respect to the handle, the substance containing chamber having a nozzle opening at a first axial end, from which substance is, in use, dispensed; the substance containing chamber including a bearing at the second axial end of the substance containing chamber; a shaft rotatably fixed with respect to the handle and arranged to pass through the bearing such that upon rotation of the handle with respect to the substance containing chamber, the substance containing chamber and the handle move telescopically with respect to each other such that, the substance containing chamber moves axially within the handle to force substance through the nozzle opening, wherein movement of the handle with respect to the substance containing chamber is indexed so as to dispense a predetermined volume of substance in dependence on a rotation thereof.

Embodiments of the present invention will now be described in detail with reference to the accompanying drawings, in which.

Figure 1:
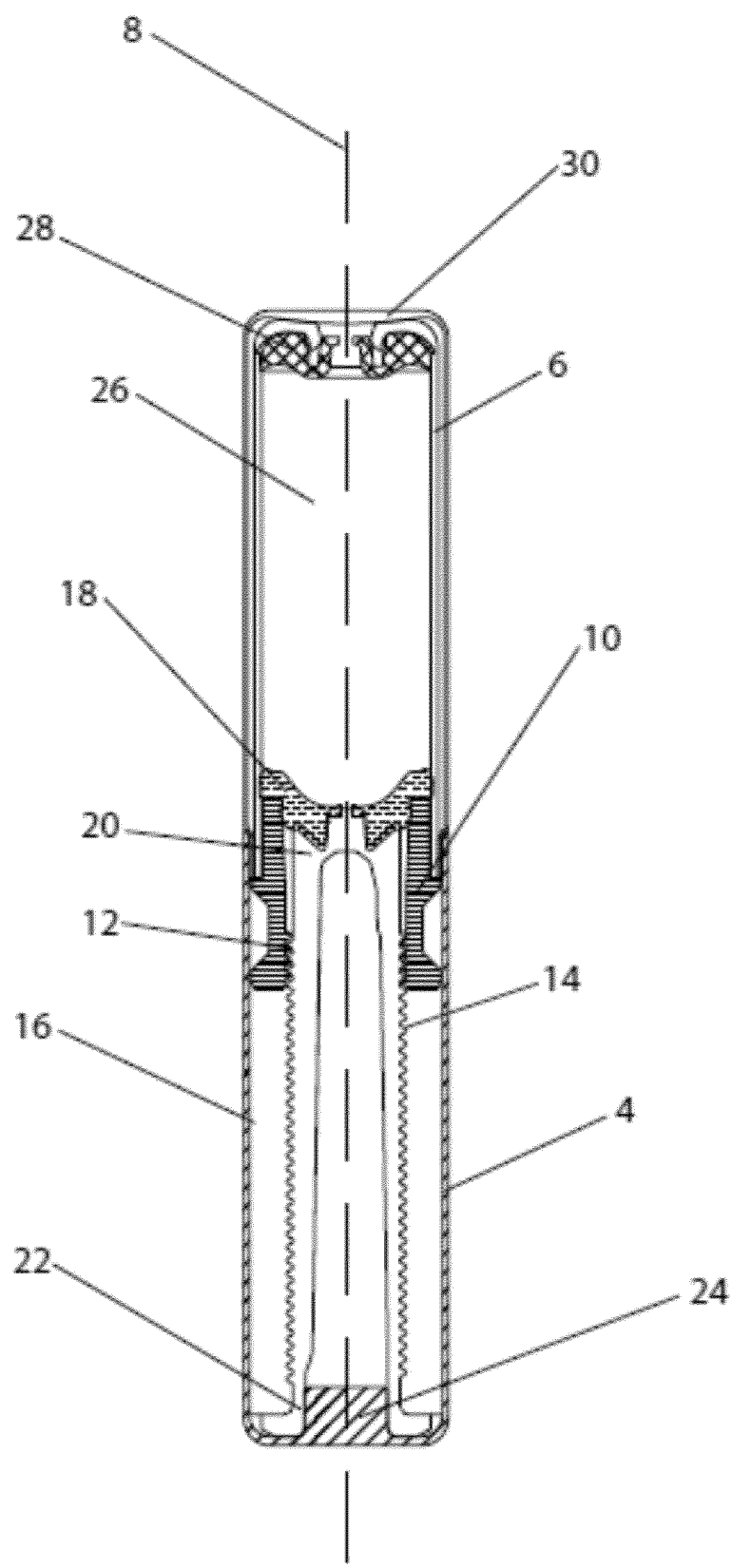
FIG. 1 is a schematic longitudinal cross-sectional view through a substance dispenser, such as a cream dispenser.

There is provided a dispenser for dispensing a metered amount of a substance such as a cream, gel, other viscous or non-viscous substance or other substance such as a medicinal ointment or a cosmetic cream. For clarity and brevity herein the dispenser will be described as a cream dispenser, and components of the dispenser described accordingly although it will be understood that the dispenser is for dispensing a metered amount of substances other than creams as well.

The dispenser comprises a first housing member that defines a handle for the dispenser. A cream containing chamber is also provided and is arranged to move telescopically with respect to the handle member. The cream containing chamber has an opening such as a nozzle at a first end, and in use, when the handle is turned relative to the cream containing chamber, the volume of the cream containing chamber is effectively reduced so as to dispense cream from the opening or nozzle. The nozzle also preferably is configured so as to stop the contents of the chamber, i.e. a cream, from evaporating. As will be explained below means for controlling the amount of relative rotation is provided which thereby ensures that the amount of cream that is forced out of the opening due to a single turn is carefully controlled. Thus a metered dispensing of cream is achieved.

A bearing is provided, axially fixed with respect to the cream containing chamber at the second axial end of the chamber, i.e. at the opposite longitudinal end from that of the opening or nozzle. A shaft is rotatably fixed with respect to the handle and arranged to pass through the bearing such that upon rotation of the handle with respect to the cream containing chamber, the cream containing chamber and the handle move telescopically with respect to each other. The cream containing chamber thus moves axially within the handle to force cream through the nozzle opening. A will be explained below, movement of the handle with respect to the cream containing chamber is indexed so as to dispense a predetermined volume of cream in dependence on a rotation thereof. In other examples, the relative telescopic movement is such that the handle moves telescopically within the cream containing chamber, and in such an example the relative dimensions of the parts of the housing, i.e. the handle and the cream containing chamber will need to be configured accordingly.

A simple and robust dispenser is provided that is able to reliably and repeatably deliver a selected metered volume of cream. Due to the fact that in use the cream containing chamber is effectively drawn into the housing of the handle, as cream is dispensed the length of the whole assembly reduces. In other words, the outer combined envelope of the handle and cream containing chamber reduces such that a quick viewing of the dispenser will immediately provide an indication of how much cream is left in the dispenser. This is particularly the case since a mechanism is preferably provided that precludes the possibility of relative axial movement in the opposite direction. In other words the dispenser is preferably configured so that lengthening of the envelope by relative rotation of the handle and cream containing chamber is not possible. This therefore means that at any point in time, whatever the combined external envelope of the handle and cream containing chamber happens to be, is a clear indication of how much cream is left in the cream containing chamber. In a preferred example, a scale is applied on an external surface of the cream containing chamber (or of the handle) so as to provide another means of indicating to a user the remaining volume or number of doses so far undispensed. In other words, it is preferred that in one example, the cream containing chamber has a scale provided on an external surface thereof to provide a visual indicator of the volume of available material within the chamber. A user can see from a quick look at the container that, say a certain specific number of days' worth of cream remains in the dispenser (or cream containing chamber).

Figure 2:
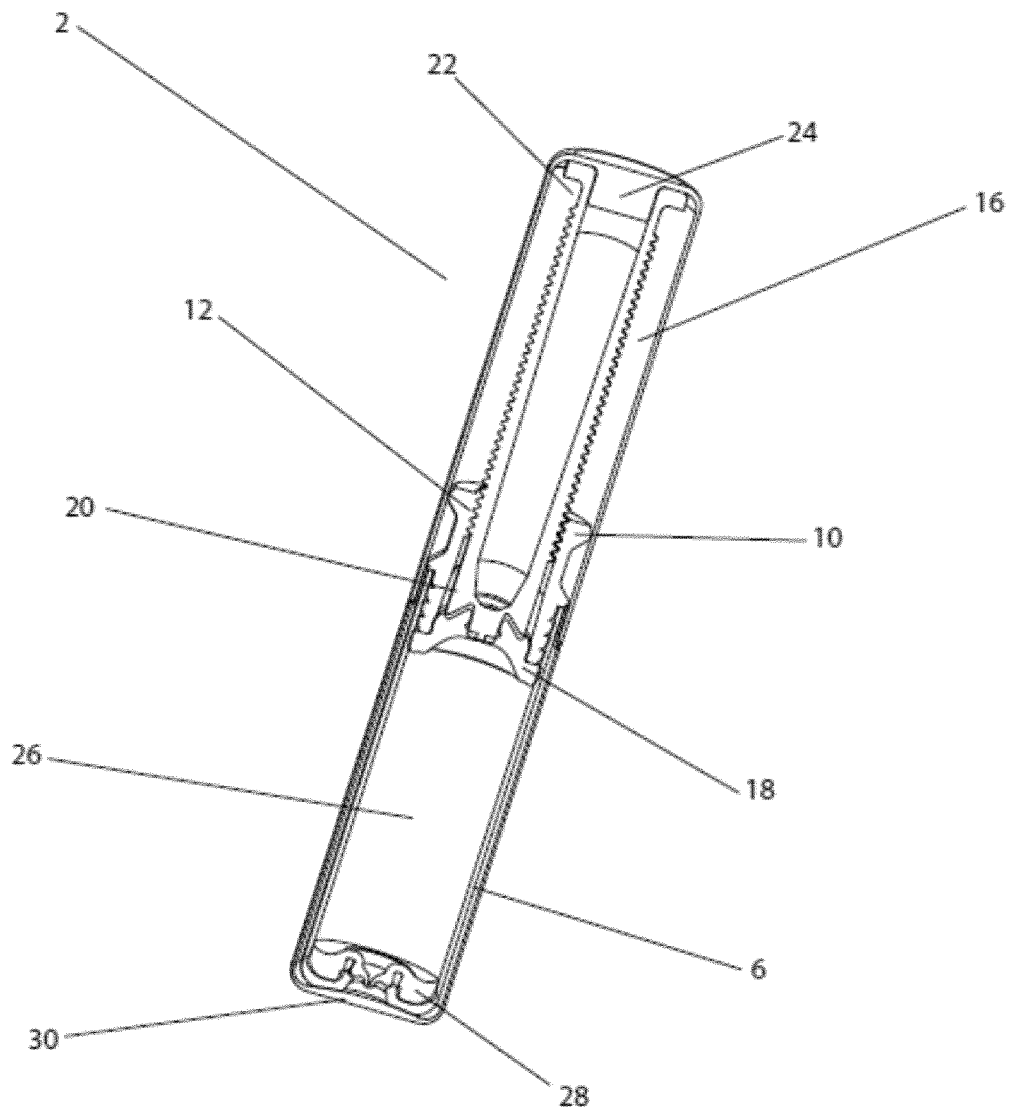
FIG. 2 is a schematic perspective view of a longitudinal cross-section through a substance dispenser, such as a cream dispenser.
Figure 3:
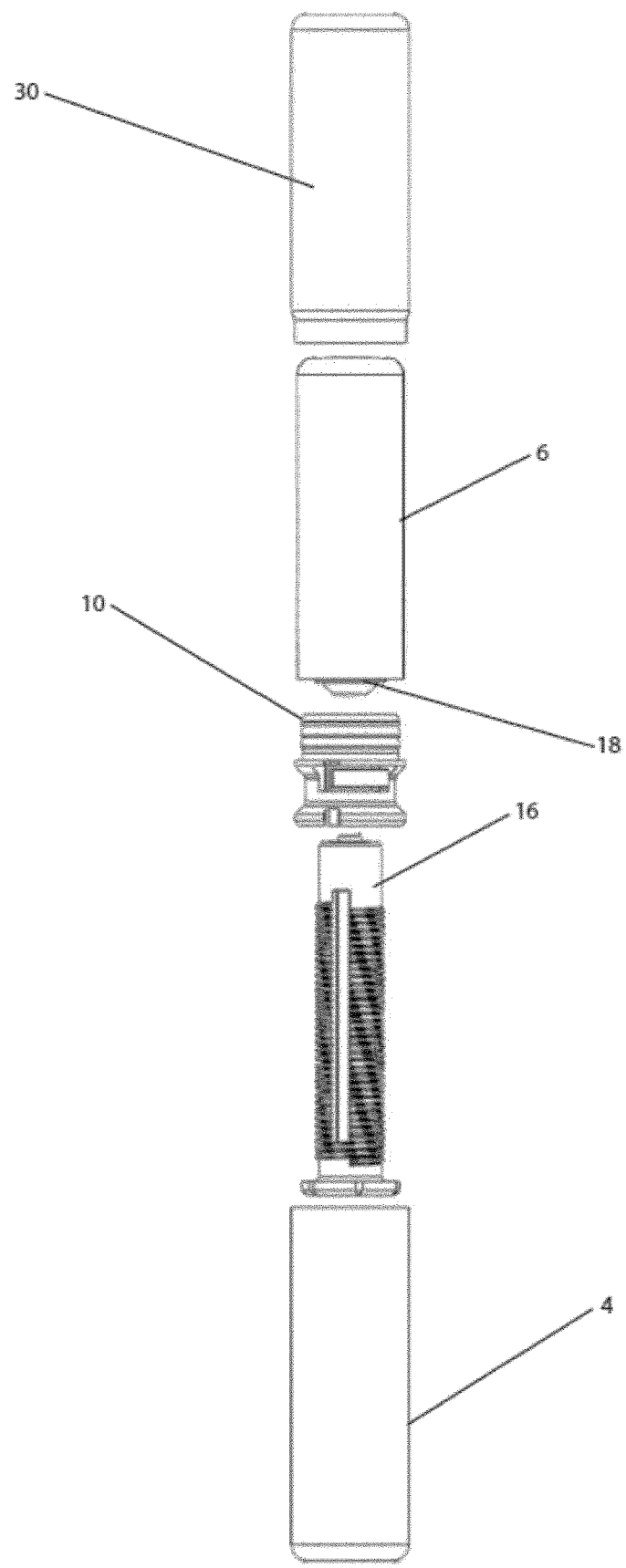
FIG. 3 is a schematic exploded view of the component parts of a substance dispenser, such as a cream dispenser.

FIGS. 1 and 2 are schematic longitudinal cross sectional views through a cream dispenser 2. The dispenser comprises a handle 4 for turning, and a cream containing chamber 6. The handle 4 and cream containing chamber 6 are arranged to rotate relative to each other about a longitudinal axis 8 of the dispenser 2. The dispenser 2 includes a bearing 10 that is fixed both axially and rotationally with respect to the cream containing chamber 6. The bearing 10 comprises an inner circumferential thread 12 arranged to engage with a thread 14 provided on an external cylindrical surface of a shaft 16.

The operation of the cream dispenser will be described in detail below, but in general, it will be understood that upon rotation of the turning handle 4 about the longitudinal axis 8 the shaft 16, being rotationally fixed to the handle, via interaction between the threads 12 and 14 is drawn rightwards in FIG. 1 (leftwards in FIG. 2). A plunger 18 is provided, fixedly mounted to a first, distal, end 20 of the shaft 16. At a second, proximal, end 22 the shaft 16 is fixed to the handle. The fixing of the shaft to the handle is preferably achieved by a press fit engagement with a boss 24 formed as part of the handle 4. Other ways of fixing the shaft to the handle may be used. In one example the shaft 16 and the handle are provided as a unitary moulded part. In another example a rivet or fixing device is used to fixedly couple shaft 16 to the handle 4.

The bearing 10 is in a fixed position with respect to the substance containing chamber 6. This means that as the handle 4 is rotated about longitudinal axis 8 with respect to the cream containing chamber 6, the cream containing chamber will effectively be pulled into the handle 4 (or its outer housing). Thus, the volume within the cream chamber is sequentially reduced upon each movement of the cream chamber into the handle 4. The bearing, fixed with respect to substance containing chamber (see for example FIGS. 6A to 6C) will slide against the internal wall of the handle 4. The plunger 18, fixed to the end of the shaft 16, is in sealing engagement with the internal wall of the substance containing chamber.

Referring again to FIGS. 1 and 2, as can be seen, the substance containing chamber 6 defines a volume 26 between the plunger 18 and a nozzle or seal 28 at the distal end of the cream containing chamber 6. As the plunger moves relative to the seal 28 cream is forced out of the opening provided by the seal 28. Preferably the nozzle or opening provided by the seal 28 is a one way valve that is pressure actuated to open and allow dispensing of cream.

As can be seen, the shaping and structure of the seal 28 and the plunger 18 is selected so as to provide a male/female correspondence. This ensures that there is effectively very little or even no dead space at all between the components 18 and 28. As the dispenser 2 nears the end of its operation, when the cream containing chamber has effectively been incorporated entirely within the envelope of the handle 4, the plunger 18 and the seal 28 will be arranged in close-fitting positions with minimal volume between the two.

A lid 30 is provided which is sized to closely fit around the cream chamber when it is in its most extended form, i.e. having a maximum volume before use. The lid is chosen so as to have the same diameter (in cross section) as the turning handle, such that when the lid and the turning handle are arranged in a closed configuration, the dispenser 2 appears generally as a circular cylinder.

Figure 5:
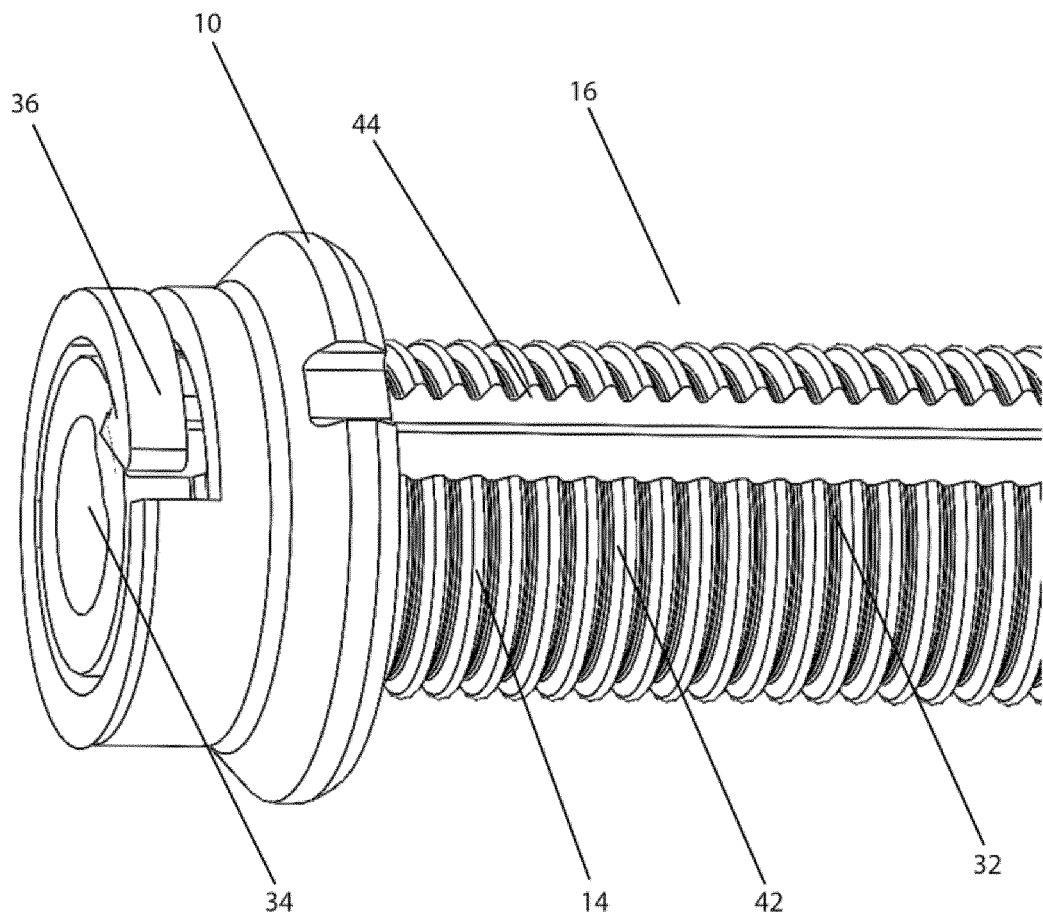
FIG. 5 is a perspective view of a shaft and bearing from a substance dispenser, such as a cream dispenser; and, FIGS. 6A to 6C are schematic longitudinal cross-sectional views through a substance dispenser, such as a cream dispenser at different stages of a lifecycle of the dispenser.

Referring to FIG. 5, there is shown an example of the shaft 16 in engagement with the bearing 10. The shaft 16 comprises an external thread 14 that extends along substantially its entire axial length. As can be seen, the thread is discontinuous around the body of the shaft 16 in that it has a longitudinal groove 32 that also extends along substantially the entire length of the shaft 16. The bearing 10 has an internal thread (not visible in FIG. 5) that engages with the thread 14 on the outer circumferential surface of the shaft 16. The bearing has a generally circular cross section with an opening 34 sized to allow the shaft 16 to move axially through it as it is rotated relative to the bearing 10. The bearing 10 includes a biasing member 36 in the form, in this embodiment, of a radial leaf spring. The leaf spring 36 is biased radially inwards towards the centre of the shaft 16.

Figure 4:
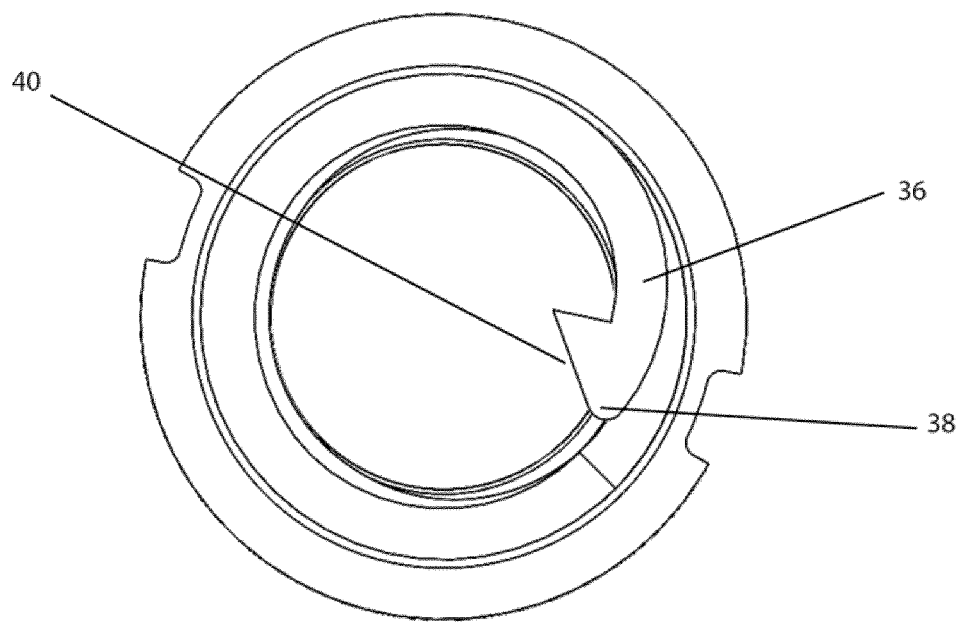
FIG. 4 is a plan view of a shaft and bearing from a substance dispenser, such as a cream dispenser.

Referring to FIG. 4, as can be seen, the end 38 of the biasing member 36 is shaped in such a way so as to engage with the groove 32 and, under the force of the biasing spring, to rotationally lock the shaft 16 relative to the bearing 10. The end portion 38 of the leaf spring has a cam surface 40 that is angled and shaped to engage with a first surface 42 of the groove 32. Accordingly, to force relative rotation of the bearing and the shaft 16, a certain degree of pressure will be required, which, in use, is driven by a user turning the handle 4, thereby causing the surface 40 of the end 38 and the first surface 42 of the groove 32 to slide relative to each other so as to force the biasing member 36 out of the groove 32 and thereby enable relative rotation of the shaft 16 and the bearing 10.

Accordingly, it can be seen that a relatively vertical radial second surface 44 is provided on an opposite longitudinal side of the groove 32 such that once the shaft 16 has rotated about the longitudinal axis 8 relative to the bearing 10, the biasing member 36 will click back into the groove 32. This means that the relative movement between the bearing 10 and the shaft 16 is carefully and yet simply moderated to ensure that it move precisely one pitch of the thread 14 between audible clicks and before again requiring an additional force to cause rotation.

In one example, a number of longitudinal grooves such as groove 32 are provided along the outer cylindrical surface of the shaft 16. If, for example, two such grooves are provided diametrically opposite to each other, this will mean that upon each full rotation of the shaft relative to the bearing 10, the system will click twice as the end 38 of the biasing member 36 falls back into the corresponding groove. By providing more than one longitudinal groove, the relative movement of the plunger with respect to the cream chamber 6 can be carefully controlled and moderated. In one example, the grooves are spaced at different distances apart around the cylindrical surface of the shaft. In other words instead of being diametrically opposed, they could be at other variably selected or determined angular positions. For example, they could be at, say, angular positions of 0 degrees and 120 degrees. This will mean that consecutive doses will be half or double the size of the previous dose. Such flexibility is useful in the cases of multiple doses being required for some particular patients, or for a stronger or larger dose being required every second day or time period.

The mechanism provides an indexing of the relative axial movement between the handle and the cream dispensing chamber in that a defined number of positions exist when the biasing member is temporarily fixed in one of the longitudinal grooves along the length of the shaft 16.

The engagement of the shaft 16 with the housing of the handle 4 is arranged such that no rotation of the shaft 16 is possible relative to the handle 4. This achieves the technical effect that rotation of the handle causes corresponding rotation of the shaft 16 and therefore corresponding relative axial movement between the handle 4 and the cream containing chamber 6.

In the example of FIGS. 4 and 5, the biasing member is arranged as a radial leaf spring. In another embodiment, a radially arranged heliacal or other compressible spring member is provided arranged radially between the bearing 10 and the outer cylindrical surface of the shaft 16. Again, some degree of camming is required to ensure the tactile and audible interaction between the shaft 16 and the bearing 10. The use of a radial leaf spring is preferred since it simply enables the bearing and biasing member or spring to be provided as a unitary component.

In another example (not shown) the indexing mechanism is provided with respect to the internal cylindrical surface of the handle, as opposed to being provided on the external cylindrical surface of the shaft 16. In this example one or more grooves or longitudinal projections are provided or formed on the inner cylindrical surface of the handle and the biasing member is biased outwards towards the inner cylindrical surface of the handle. The thread in this situation can be provided without the longitudinal grooves as the indexing is provided by the engagement between the biasing member and the longitudinal lines or projections that are formed or provided on the inner cylindrical surface of the handle and project some small distance into the cavity of the handle.

Figures 6A, 6B, 6C:
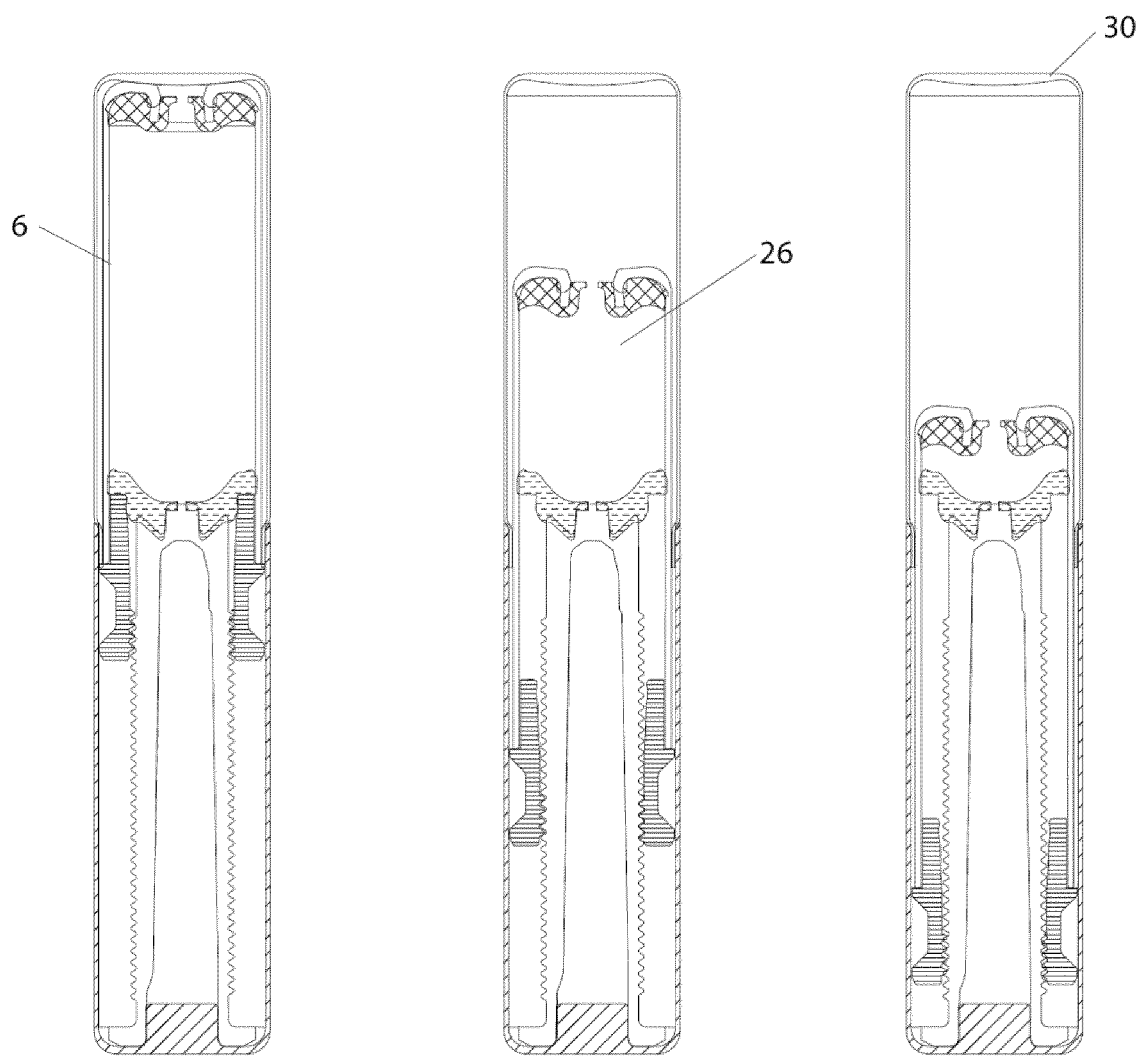

FIGS. 6a to 6c show three views of the cream dispenser 2 at various stages of use. In FIG. 6a, the cream containing chamber 6 is at maximum volume which is how the prefilled dispenser might typically first be provided to a user. In FIG. 6b, the user will have used about a third of the cream within the container, and in FIG. 6c about three quarters or four fifths of the cream will have been used.

As can be seen in all of FIGS. 6a to 6c, the lid 30 is positioned over the cream containing chamber 6 such that, externally and on first impression, the cream dispenser will look the same irrespective of the relative position of the handle and the cream containing chamber. In one example, a longitudinal viewing window (not shown) may be provided in the lid 30 so as to provide a quick and easy visual indication of the amount of cream within the cream containing chamber.

In a preferred example, the number of pitch threads provided on the shaft 16 is selected to be a number that corresponds to a dosing window for a particular medicament. For example, it is preferred in one example that the thread includes thirty one or thirty two pitches such that the dispenser can simply be used to provide a predefined volume of cream, once a day for each day of any month. It is imagined that at the end of the month, the cream dispenser can be discarded and appropriate components recycled.

The materials from which the various components of the dispenser are manufactured may be selected for convenience and efficiency. Typically, it is expected that the shaft 16 is formed of plastic, as is the bearing 10. The housings of the handle and cream containing chamber may be formed of plastic or metal. The plunger and seal are preferably formed of a relatively soft or compressible plastic. This ensures that the seal between the outer circular wall of the plunger and the inner cylindrical surface of the cream containing chamber may easily and conveniently be guaranteed to be hermetically sealed. Furthermore, in one example, one of the plunger and the seal formed of a softer deformable plastic and the other is formed of a hard plastic. This ensures that when the two are brought together the hard plastic of one of the components will define the eventual shape of interaction between the components.

Typical dimensions of the dispenser may be selected so as to deliver a desired amount of cream. In one non-limiting example, it is expected that the entire length of the dispenser 2 including the handle, i.e. the length of the system as shown in FIG. 6a, will be between 100 and 150 mm. Preferably, the length will be 125 mm.

The length of the device (without lid) when completely used will typically be between 60 and 80 mm, and preferably 70 mm.

The diameter of the cream chamber and the dispenser in general as a whole, is preferably between 20 and 25 mm, and more preferably 23 mm.

It is preferred that the cream may be dispensed from the dispenser includes any one or more of a moisturiser, a skin care cream, a pharmaceutical cream, a dermatological composition, or any other suitable medicament or cream. Other applications could be for veterinarian use, and as explained above are not limited to creams, but rather include other substances including viscous or non-viscous substances.

The dispenser is arranged and configured such that it is capable of delivering a precise dose of cream upon each day, or indeed at other selected time intervals. In one example the system may be dimensioned or configured to so as to provide multiple doses per day or one dose every 2, 3 or any other number of days. Accordingly, one revolution of turning handle relative to the cream containing chamber moves the bearing (attached to the cream containing chamber) down one thread pitch, thereby causing one dose of cream to be dispensed from the top of the cream chamber. A click at the end of a dose is provided when the end 38 of the spring falls back into the longitudinal groove, which lets the user know that a dose has been delivered. Furthermore, the shaping of the longitudinal edge surfaces of groove 32 and/or the shape of cam surface on the end 38 of the biasing member are provided such that it is not possible for a user to rotate the handle and cream containing chamber in the wrong rotational direction relative to each other.

As mentioned above, the pitch of the thread is selected so as to give a fixed number of doses until the dispenser has been used and ready to be discarded, e.g. for recycling or refilling if appropriate. In a preferred example, the thread has exactly thirty two thread pitches on it meaning that the package contains exactly thirty two doses of cream. As the dispenser is used, the length is changed as the doses come out which therefore demonstrate progress to a user. The cream containing chamber in effect, is incorporated into the outer envelope of the turning handle. It is preferred that a scale be written on the cream containing chamber, on the outside of it, thereby showing a user how many doses remain.

Embodiments of the present invention have been described with particular reference to the examples illustrated. However, it will be appreciated that variations and modifications may be made to the examples described within the scope of the present invention.

The invention claimed is:

1. A dispenser for dispensing a metered amount of a viscous substance, the dispenser comprising a first housing member defining a handle for the dispenser, the handle having a female shaped engagement region;

a viscous substance containing chamber arranged to slide telescopically with respect to the handle, the viscous substance containing chamber having a nozzle opening at a first axial end, from which viscous substance is, in use, dispensed;

the viscous substance containing chamber including a bearing axially fixed at the second axial end of the viscous substance containing chamber;

a shaft rotatably fixed with respect to the handle and arranged to pass through the bearing such that upon rotation of the handle with respect to the viscous substance containing chamber, the viscous substance containing chamber and the handle move telescopically with respect to each other such that, the viscous substance containing chamber moves axially within the handle to force viscous substance through the nozzle opening, wherein movement of the handle with respect to the viscous substance containing chamber is indexed so as to dispense a predetermined volume of viscous substance in dependence on a rotation thereof the nozzle opening at the first axial end for dispensing the viscous substance having a seal in the form of a pressure actuated valve to open and allow dispensing of the viscous substance onto a dispensing surface formed on an external side of the seal for a user to engage with dispensed viscous substance, the seal having a male shaped engagement region projecting into the body of the dispenser the handle and the seal arranged in combination to provide a male/female correspondence to minimize dead space in the viscous substance containing chamber; and wherein the bearing and shaft comprise thread(s).

2. A dispenser according to claim 1, in which the bearing and the shaft are arranged in a threaded engagement.

3. A dispenser according to claim 2 in which the thread on the shaft is discontinuous around the body of the shaft.

4. A dispenser according to claim 2, in which the indexed movement comprises an indexing mechanism comprising a spring member biased to engage with a groove or projection provided on an inner cylindrical surface of the handle.

5. A dispenser according to claim 1 in which the thread on the shaft is discontinuous around the body of the shaft.

6. A dispenser according to claim 5, in which the shaft has a generally tubular body with the thread arranged on an about circumferential surface thereof, and wherein the discontinuity is formed by a longitudinal groove extending along at least part of the length of the shaft.

7. A dispenser according to claim 6 in which the shaft has at least two grooves formed along its length on different sides of the shaft such that each part of the thread extends radially for less than 180 degrees.

8. A dispenser according to claim 7 wherein the bearing has a spring member biased to engage with an edge of the one or more grooves.

9. A dispenser according to claim 6 wherein the bearing has a spring member biased to engage with an edge of the one or more grooves.

10. A dispenser according to claim 9, in which the spring member is a radial leaf spring having an engagement end that is biased into the one or more grooves and when in position in one of the one or more grooves temporarily locks the shaft rotationally with respect to the bearing.

11. A dispenser according to claim 10, in which the leaf spring has an engagement end with a shaped cam to engage an edge of the one or more grooves.

12. A dispenser according to claim 11 in which an angle is selected for the cam to ensure that accidental rotation of the handle and viscous substance containing container does not happen.

13. A dispenser according to claim 1 in which the indexed movement comprises an indexing mechanism comprising a spring member biased to engage with a groove or projection provided on an inner cylindrical surface of the handle.

14. A dispenser according to claim 13, in which the spring member is formed integrally with the bearing or indexing mechanism.

15. A dispenser according to claim 13, in which the inner cylindrical surface of the handle has at least two longitudinal grooves or projections formed thereon.

16. A dispenser according to claim 1, comprising a plunger fixed to an end of the shaft and in sealing engagement with an internal wall of the viscous substance containing chamber.

17. A dispenser according to claim 1, in which the seal is a hermetic seal, to limit or avoid evaporation from the viscous substance containing chamber.

18. A dispenser according to claim 1, in which the viscous substance containing chamber has a scale provided on an external surface thereof to provide a visual indicator of the volume of available material within the chamber.

19. A method of providing a dispenser, the method comprising providing a first housing member defining a handle for the dispenser, the handle having a female shaped engagement region;

a viscous substance containing chamber arranged to slide telescopically with respect to the handle member, the viscous substance containing chamber having a nozzle opening at a first end, from which viscous substance is, in use, dispensed;

a bearing axially fixed with respect to the viscous substance containing chamber at the second axial end;

a shaft rotatably fixed with respect to the handle and arranged to pass through the bearing or indexing mechanism such that upon rotation of the handle with respect to the viscous substance containing chamber, the viscous substance containing chamber and the handle move telescopically with respect to each other such that, the viscous substance containing chamber moves axially within the handle to force viscous substance through the nozzle opening, wherein movement of the handle with respect to the viscous substance containing chamber is indexed so as to dispense a predetermined volume of viscous substance in dependence on a rotation thereof the nozzle opening at the first axial end having a seal in the form of a pressure actuated valve to open and allow dispensing of the viscous substance, the seal having a male shaped engagement region projecting into the body of the dispenser, the handle and the seal arranged in combination to provide a male/female correspondence to minimize dead space in the viscous substance containing chamber.

20. A method of dispensing a metered amount of a viscous substance from a dispenser, the dispenser comprising a first housing member defining a handle for the dispenser, the handle having a female shaped engagement region;

a viscous substance containing chamber arranged to slide telescopically with respect to the handle, the viscous substance containing chamber having a nozzle opening at a first axial end, from which viscous substance is, in use, dispensed; the viscous substance containing chamber including a bearing axially fixed at the second axial end of the viscous substance containing chamber;

a shaft rotatably fixed with respect to the handle and arranged to pass through the bearing such that upon rotation of the handle with respect to the viscous substance containing chamber; the method comprising:

moving the viscous substance containing chamber and the handle move telescopically with respect to each other such that, the viscous substance containing chamber moves axially within the handle to force viscous substance through the nozzle opening, wherein movement of the handle with respect to the viscous substance containing chamber is indexed so as to dispense a predetermined volume of viscous substance in dependence on a rotation thereof;

the nozzle opening at the first axial end for dispensing the viscous substance having a seal in the form of a pressure actuated valve to open and allow dispensing of the viscous substance onto a dispensing surface formed on an external side of the seal for a user to engage with dispensed viscous substance, the seal having a male shaped engagement region projecting into the body of the dispenser; and upon a final activation of the indexing mechanism female shaped engagement region of the handle engaging with the male shaped engagement region of the seal to provide a male/female correspondence and minimize dead space in the viscous substance containing chamber; and wherein the bearing and shaft comprise thread(s).

* * * * *